United States Patent [19]
Bradley
[11] 3,735,166
[45] May 22, 1973

[54] PIEZOELECTRIC CRYSTAL ASSEMBLY

[75] Inventor: Deward C. Bradley, Sandwich, Ill.
[73] Assignee: CTS Corporation, Elkhart, Ind.

[22] Filed: Oct. 6, 1971
[21] Appl. No.: 186,990

[52] U.S. Cl. ....................310/9.4, 310/8.2, 310/8.9, 310/8.5
[51] Int. Cl. ....................H04r 17/00
[58] Field of Search ....................310/9.1–9.4

[56] References Cited

UNITED STATES PATENTS

| | | | |
|---|---|---|---|
| 2,513,870 | 7/1950 | Hoffman | 310/9.4 X |
| 2,503,429 | 4/1950 | Ziegler | 310/9.4 X |
| 2,412,030 | 12/1946 | Baldwin | 310/9.4 X |
| 2,394,999 | 2/1946 | Keller | 310/9.2 |
| 3,566,164 | 2/1971 | Boillat | 310/9.1 |
| 2,824,219 | 2/1958 | Fisher et al. | 310/9.4 |
| 3,185,870 | 5/1965 | Stoddard et al. | 310/9.4 |
| 3,054,915 | 9/1962 | Houck | 310/9.4 X |
| 3,581,126 | 5/1970 | Omlin | 310/9.4 X |
| 2,362,797 | 11/1944 | Bokovoy | 310/9.4 |
| 2,329,498 | 9/1943 | Washburn | 310/9.4 |
| 2,121,340 | 6/1938 | Curtis | 310/9.4 X |
| 2,386,692 | 10/1945 | Kuenstler | 310/9.4 X |

*Primary Examiner*—J. D. Miller
*Assistant Examiner*—Mark O. Budd
*Attorney*—Wolfe, Hubbard, Leydig, Voit & Osann

[57] ABSTRACT

A piezoelectric crystal assembly in which a base is provided having small diameter tubulations parallel to one another with a center-to-center spacing which corresponds to the center-to-center spacing of crystal lead wires which extend straight downwardly at right angles from the undersurface of the crystal, with the leads being telescoped into the tubulations and soldered therein to provide the sole support for the crystal and with the lead wires being elongated to extend beyond the tubulations for direct connection to associated circuit components. The tubulations are flared to provide guidance for the lead wires and to accommodate an annular body of solder. The crystal is spaced upwardly from the tubulations to provide straight free lengths of lead wire for accommodation of torsional vibration imparted to the lead wires by the crystal.

2 Claims, 7 Drawing Figures

PIEZOELECTRIC CRYSTAL ASSEMBLY

It is an object of the invention to provide a piezoelectric crystal assembly which is highly compact, which is easily assembled, and which is simple and inexpensive, with the crystal lead wires forming the sole support of the crystal within its enclosure in addition to the making of electrical connection. It is a related object to provide a crystal mount which is not only economical but which permits the crystal to operate in a highly efficient manner and with a high degree of stability of frequency and resistance upon passage of time and in the face of temperature changes, shock and vibration. It is more specifically an object to provide a crystal mount which has an extremely favorable acoustical termination minimizing the transmission of vibrational energy to the supporting structure.

It is a related object to provide a crystal assembly in which light gauge lead wires extending perpendicularly from the undersurface of a crystal are brought out through flared tubulations which seal and support the wires while maintaining their perpendicularity and spacing, the wires being extended substantially beyond the tubulations for direct connection to associated circuit components.

It is yet another object of the invention to provide a piezoelectric crystal assembly which is easily and quickly assembled and well adapted for manufacture on a high production basis employing automated assembly equipment.

Other objects and advantages of the invention will become apparent upon reading the attached detailed description and with reference to the accompanying drawings in which.

While the invention has been described in connection with a preferred embodiment, it will be understood that it is not intended to be limited to the particular embodiment shown but it is intended on the contrary to cover the various alternative and equivalent constructions included within the spirit and scope of the appended claims.

Figure 1:
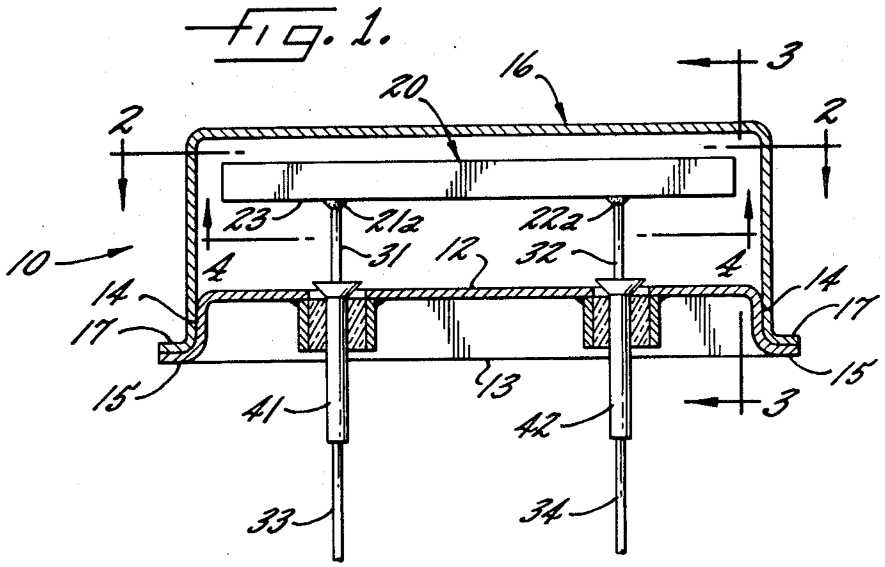
FIG. 1 is a side elevation of a crystal and enclosure constructed in accordance with the present invention and looking along the line 1—1 of FIG. 2.
Figure 2:
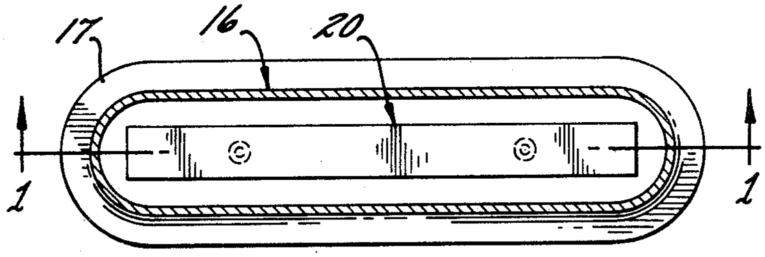
FIG. 2 is a plan view looking along the line 2—2 in FIG. 1.
Figure 3:
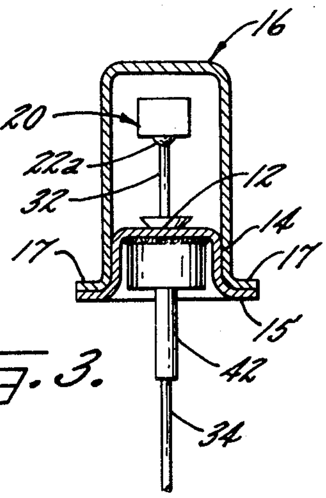
FIG. 3 is a side elevation looking along the line 3—3 in FIG. 1.

Turning now to the drawings (FIGS. 1 to 3) there is disclosed a crystal assembly 10 including a base 11 in the form of an inverted boat of thin metal having a flat top surface 12, parallel side walls 13, and rounded end walls 14, the walls being bounded by a flange 15. Fitted to the base is a cover or enclosure 16 having a flange 17.

Figure 4:
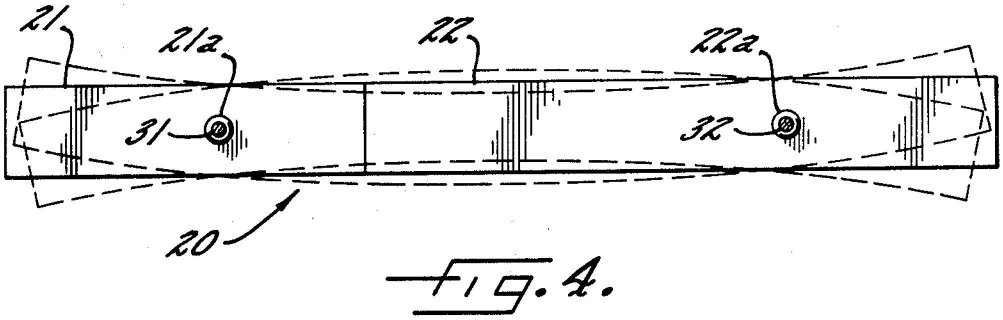
FIG. 4 shows the profile of the crystal, viewed from the underside, undergoing vibration in the flexural mode.

Mounted within the enclosure is a crystal 20 having "wrap-around" electrodes 21,22 and an undersurface 23 (see also FIG. 4). Applying such electrodes by metalizing or the like is a matter well within the skill of the art. For the purpose of making contact with the electrodes, points of connection **21*a*,22*a*** are provided. The latter are preferably located symmetrically on the crystal at nodal positions. The crystal is preferably of the *x–y* flexure cut mounted to vibrate in the horizontal flexural mode. The nodal positions may, for present purposes, be defined as points which do not undergo any change in lateral spacing as the crystal vibrates.

Figure 5:
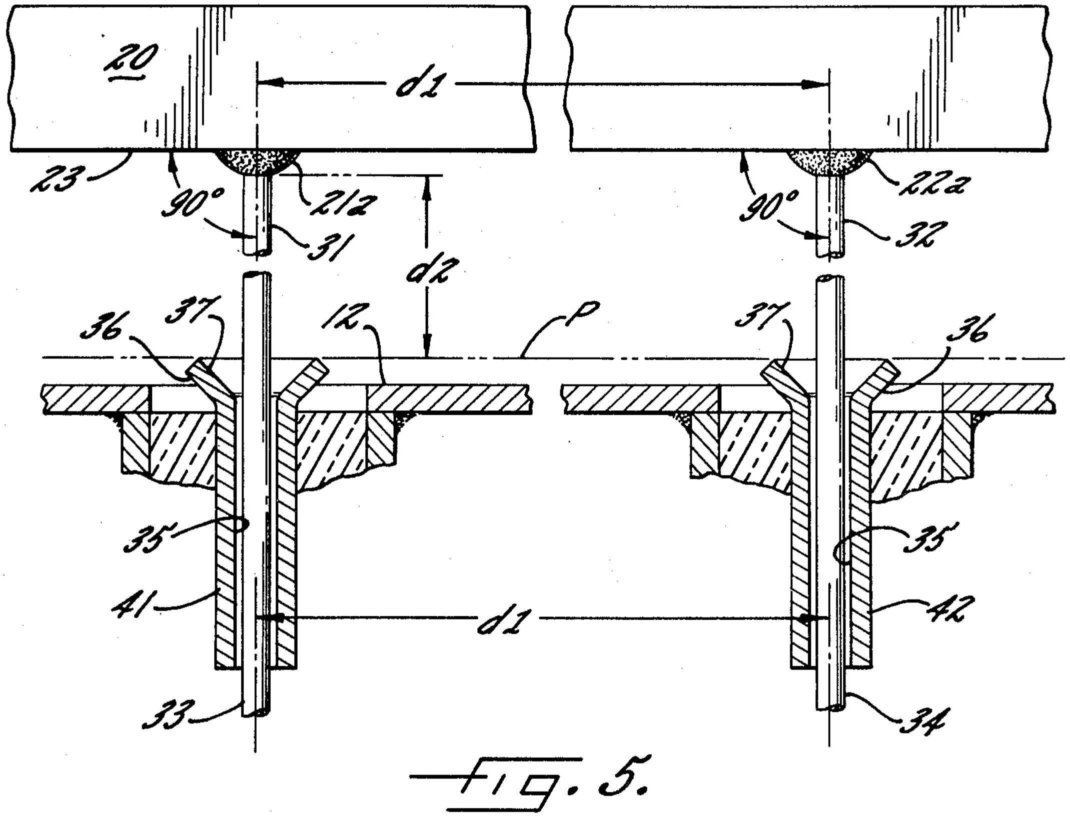
FIG. 5 is a diagram showing the registered relationship between the crystal lead wires and the tubulations.

In accordance with the present invention the crystal is provided, on its undersurface, with lead wires soldered to the points of connection **21*a*,22*a* and which extend straight downwardly in parallel relation for telescoped reception in thin parallel tubulations in the base, tubulations having a center-to-center spacing which is equal to the center-to-center spacing of the leads so that when the lead wires are inserted into the tubulations the straight perpendicular relationship between the lead wires and the crystal is maintained, with the lead wires forming the sole support of the crystal. Further in accordance with the invention the tubulations are flared outwardly at their upper ends to provide funnel-shaped guide surfaces for guiding the lead wires into the tubulations as well as to provide space for an annular body of solder which is in communication with the capillary space between the wire and the tubulation. Thus, referring first to FIG. 1 lead wires indicated at 31,32 having ends 33,34 are soldered to the connection points 21*a*,22*a*** on the crystal, extending straight down at a spacing *d*1 at right angles from the undersurface 23 of the crystal. For registering with the lead wires and having the same center-to-center spacing d1 are a pair of thin tubulations 41,42 made of metal and having an inner diameter which is just sufficient so that the lead wires are telescopingly accommodated with free sliding movement while defining an annular capillary space 35 (FIG. 5) between each lead wire and its associated tubulation. The tubulations preferably terminate at their upper ends in a plane P which is spaced at or slightly above the surface 12 of the base, and each tubulation is provided at its upper end with a flare 36 which defines a funnel-shaped guide surface 37 for facilitating entry of the lead wires during assembly and for the purpose of providing space for an annular body of solder 38 to which solder is fed, in the molten state, from the adjacent capillary space for sealing as well as supporting the wires.

By entering the lead wires 31,32 into correspondingly spaced and fitted openings in a pair of tubulations the lead wires are maintained parallel to one another and perpendicular to the crystal to which they are attached. In this way the wires serve as the sole support of the crystal but are otherwise totally unstressed so that no steady stress is applied to the crystal face. Moreover, in accordance with the invention the crystal is spaced above the plane of the upper ends of the tubulations by an amount *d*2 (FIG. 5) to provide a free straight length of lead wire *d*2 adjacent the point of attachment for accommodation of the vibration imparted to the lead wires by flexural vibration of the crystal and for minimum transmission of accoustical energy from the crystal to the mount. As a result of this, it is found that the crystal vibrates with a high degree of efficiency, thus exhibiting a high value of Q and with improved stability of frequency and resistance when subjected to changes in temperature. Preferably, the straight portion of wire between the crystal and the tubulations is tailored to one-quarter wavelength or multiple thereof. In a practical case where the crystal has longitudinal dimension of 0.460 inches the spacing d2 between the tubulations and the underside of the crystal is preferably on the order of 0.07 inches. While this amount of spacing is not great, some hundredths of an inch, it is nevertheless sufficient, when using light gauge lead wires of springy metal on the order of 0.0030 inches to 0.0075 inches in diameter, to accommodate sustained vibration. The leads are preferably made of phosphor bronze, beryllium copper or other metal or alloy which will not fatigue in the face of continuous vibratory stress.

Figure 6:
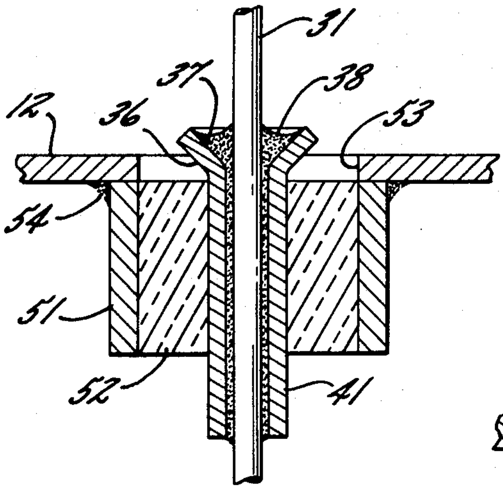
FIG. 6 is an enlarged view of a tubulation assembly, showing the solder reservoir and the associated sealed capillary.
Figure 7:
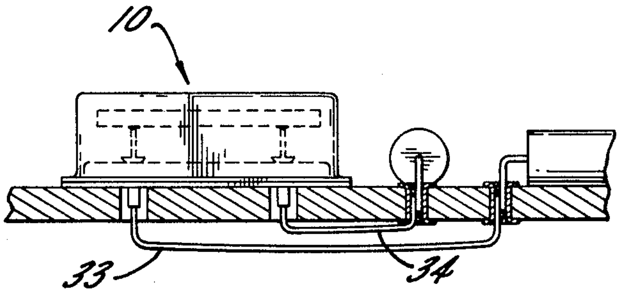
FIG. 7 is an elevational view showing the crystal assembly connected, via its pigtails, to associated circuit elements.

In carrying out the present invention the tubulations 41,42 extend through clearance holes in the base and are insulated from the base by enclosing each tubulation within a ferrule or eyelet which contains an interposed glass bead of annular shape, the ferrule and tubulation both being made of a metal such as that which is commercially available under the name of KOVAR, an alloy consisting or iron, cobalt, and nickel, having a temperature coefficient of expansion which is compatible with that of the glass, so that the assembly may be subjected to wide temperature swings without affecting the seal. As shown, for example, in FIG. 6, the tubulation 41 is surrounded by a ferrule 51, with the annular space being sealed by a glass bead 52. The ferrule is centered with respect to a clearance opening 53 formed in the base and sealed to the base by means of a solder joint 54. The glass bead is in contact only with the tubulation and ferrule and does not engage the base, enabling the tubulation to be fused in place within the ferrule as a subassembly prior to soldering to the base. However, if desired, the ferrules and associated glass insulators may be dispensed with and the necessary support and insulation may be provided by filling the hollow of the base 11 with epoxy or other impervious plastic material while holding the tubulations centered, by an annulus of rigid insulation, within the clearance openings and precisely spaced in parallel relation at the reference dimension *d*1.

The result is to produce a crystal assembly having a minimum number of parts, which utilizes the crystal lead wires for total support, and which is compact with no space being taken up within the enclosure by the usual sub-mount structure. The structure thus may be easily assembled either by hand on a production line basis or by use of automated assembling equipment.

During the course of assembly the bases 11, with the flared tubulations 41,42 secured therein, are passed in spaced succession to an assembling station where a crystal 20, with leads 31,32 attached, is dropped into register, with the tips of the leads being funneled into position by reason of the flare at the upper ends of the tubulations. A suitable spacer may be temporarily interposed between the surface 12 of the base and the underside of the crystal to establish the desired clearance dimension *d*2. While the crystal is in this position, the lower ends of the tubulations are dipped into a bath of molten solder which feeds upwardly through the capillary 35 to the annular space 38 defined by the flare 36. Alternatively, solder may be applied to the flare itself. This step may be followed, if necessary, by cleaning to remove flux. Or, if desired, a conductive cement, or "cold solder", may be used in the flare, the solder in the flare serving in either event to provide a well-defined lower termination for the straight lengths of lead wire d2. Following this the interposed spacer may be retracted and the base advanced to a testing station for measurement of any desired parameters which serve as a check upon the operativeness and efficiency of the unit. Any units falling below standard may be ejected, with the operative units passing next to an enclosing station where the enclosing cover 16 may be applied and secured in place by cold welding of the flanges, a matter which is well within the skill of the art. If it is elected to have the enclosure in place at time of soldering it will be apparent that the soldering will serve to seal the unit as well as providing electrical contact.

Provided that the lead wires 31,32 are fixed to the crystal perpendicularly and with exact reference spacing, and provided that the tubulations 41,42 are fixed in the base parallel to one another and with the same reference spacing, readily accomplished with simple jigs, assembly is a simple matter of bringing the two parts together in approximate register, with assurance that no steady state stress will be applied to the crystal, by the lead wires, as a result of assembling and soldering in place.

Tests of the construction show that in addition to high efficiency and high stability, when compared to crystals mounted in the conventional way, the unit possesses a high degree of shock resistance. The free length of lead wire immediately below the crystal provides a sufficient degree of resilience so that the crystal, and the soldered joints *21a,22a* thereon are protected against peak forces. Shocks in excess of 3000 G have been withstood by production units without physical damage and without affecting the stability, activity, or other qualities of the crystal and without bottoming of the crystal on the inside wall of the enclosure.

The extended portions of the leads 33,34 may be made as long as necessary to reach, in pigtail fashion, the associated circuit elements; thus it is one of the features of the construction that the same piece of wire which contacts the crystal electrode maybe used to make contact with the tubulation and outside circuitry, without intervening joints or connections, resulting in a high level of reliability. The length of the wire and of the tubulation and wire itself is a matter of choice, so that the term pigtail refers to the means for making an external electrical connection and does not imply any particular length. The tubulation may be terminated a short distance below the base as shown (FIG. 5) to permit dip-soldering, or longer tubulations may be used for special purposes, for example, when it is desired to plug the enclosure into registering openings in a socket, in which case the leads would not be extended beyond the tubulation. Indeed, where the tubulation is sufficiently thin, say less than 0.014 inches, and made of ductile metal, such as soft copper, the tubulation itself may be extending downwardly from the housing to serve as a straight or bendable pigtail for making outside electrical connection. Use of copper is advantageous since it is more compatible with the copper alloy of which the lead wires are made, permitting the tubulation to be sealed by solid crimping, if desired, which would permit the soldering to be dispensed with.

Where the enclosure is filled with helium or other inert gas the use of the glass-KOVAR seal is preferred for minimizing leakage which may bring about a change in the crystal characteristics, particularly in the case of the x-y flexure cut crystals which are sensitive to changes in the composition of the surrounding gas.

While the invention is particularly applicable to crystals of the *x–y* flexure cut, it is by no means limited thereto and the invention may be applied to crystals of other cuts. Moreover, while the lead wires are preferably secured to nodal positions on the crystal and subjected to torsional vibration, the mount may be used for crystals which exhibit slight lateral vibration at the points of attachment of the lead wires. Indeed it will be appreciated that a certain amount of lateral vibration accompanies the torsional vibration in the case of a crystal undergoing flexural vibration. Referring to FIG. 4 of the drawings it will be seen that bowing of the crystal in either direction (into the positions indicated by the dotted lines) inherently reduces the center-to-center spacing of the points of attachment of the supporting wires 31, 32 so that the supporting wires undergo mutual inward and outward movement on a cyclical basis much in the nature of a tuning fork. Where the length of the wires above the base is such that the wires vibrate freely in the quarter wave mode at the frequency imparted by the crystal, as mentioned above, very little of the energy of vibration in the wires is lost to the base.

What I claim is:

1. A piezoelectric crystal assembly comprising, in combination a base having a surface providing spaced clearance openings, tubulations in the respective openings arranged parallel to one another and at right angles to the plane of the base, an annular bead of insulation securing each tubulation within its respective opening, a piezoelectric crystal vibratory in the flexural mode having a flat undersurface thereon and electrodes providing respective widely spaced nodal contact points on such undersurface, light gauge crystal lead wires secured to the contact points and extending parallel to one another at right angles from the undersurface, the center-to-center distance of the tubulations being equal to the center-to-center distance of the crystal lead wires so that when the lead wires are inserted into the tubulations the relationship between the lead wires and the crystal is maintained with the lead wires forming the sole support of the crystal with respect to the base, the tubulations having an inner diameter such that the crystal lead wires are telescopingly accommodated with a small amount of lateral clearance and free sliding movement while defining an annular capillary space between each lead wire and its associated tubulation, the tubulations terminating in a plane which is spaced adjacent the surface of the base, the tubulations each having a funneled guide surface for guiding the respective lead wires while connected to the crystal into the tubulations, means occupying the capillary spaces for making sealed contact between the lead wires and their respective tubulations, and a cover mounted on the base for enclosing the crystal, the lead wires being extended upwardly the same amount above the tubulations to provide free straight lengths of lead wire adjacent the points of attachment to the crystal for accommodation of vibration imparted to the lead wires by flexural vibration of the crystal thereby to minimize transmission of acoustical energy from the crystal to the base, the same lead wires being extended downwardly within the tubulations to provide pigtails for the making of direct electrical connection to associated circuit elements.

2. The combination as claimed in claim 1 in which the length of upward extension of the lead wires above the base is such that the wires vibrate freely in the quarter wave mode at the frequency imparted by the crystal.

* * * * *